(12) United States Patent
Hwang et al.

(10) Patent No.: US 12,056,173 B2
(45) Date of Patent: Aug. 6, 2024

(54) INFORMATION MANAGEMENT APPARATUS AND METHOD FOR OPERATING THE INFORMATION MANAGEMENT APPARATUS

(71) Applicants: HYUNDAI MOTOR COMPANY, Seoul (KR); KIA CORPORATION, Seoul (KR); UNIVERSITY OF SEOUL INDUSTRY COOPERATION FOUNDATION, Seoul (KR)

(72) Inventors: Sang Hyun Hwang, Seoul (KR); Eun Ji Kim, Seoul (KR); Jae Ho Lee, Seoul (KR); Byung Gi Choi, Seoul (KR)

(73) Assignees: Hyundai Motor Company, Seoul (KR); Kia Corporation, Seoul (KR); University of Seoul Industry Cooperation Foundation, Seoul (KR)

( * ) Notice: Subject to any disclaimer, the term of this patent is extended or adjusted under 35 U.S.C. 154(b) by 403 days.

(21) Appl. No.: 17/521,539

(22) Filed: Nov. 8, 2021

(65) Prior Publication Data
US 2022/0297289 A1 Sep. 22, 2022

(30) Foreign Application Priority Data
Mar. 22, 2021 (KR) .......................... 10-2021-0036861

(51) Int. Cl.
*G06F 16/00* (2019.01)
*B25J 9/16* (2006.01)
(Continued)

(52) U.S. Cl.
CPC ............ *G06F 16/367* (2019.01); *B25J 9/161* (2013.01); *G06F 16/214* (2019.01)

(58) Field of Classification Search
CPC ...... G06F 16/182; G06F 16/214; G06F 16/25; G06F 16/27; G06F 16/284; G06F 16/36;
(Continued)

(56) References Cited

U.S. PATENT DOCUMENTS

| 2007/0118555 | A1* | 5/2007 | Go | ............................ G06N 7/01 |
| 2009/0204564 | A1* | 8/2009 | Jung | ...................... G06Q 30/06 |
| | | | | 706/55 |
| 2012/0268580 | A1* | 10/2012 | Kim | ........................ G06F 3/017 |
| | | | | 348/61 |

FOREIGN PATENT DOCUMENTS

KR    10-2010-0077930 A    7/2010

OTHER PUBLICATIONS

Jacobsson, L., Malec, J., & Nilsson, K. (Jun. 2016). Modularization of skill ontologies for industrial robots. In Proceedings of ISR 2016: 47st international symposium on robotics (pp. 1-6). VDE. (Year: 2016).*

(Continued)

*Primary Examiner* — Diedra McQuitery
(74) *Attorney, Agent, or Firm* — Fox Rothschild LLP

(57) ABSTRACT

An information management apparatus may include a storage device that separately stores ontology information of an intelligent robot that provides a service and includes a plurality of repositories each having meta information. A storage management device sorts and stores ontology information of the intelligent robot in the plurality of repositories based on a prefix of the ontology information of the intelligent robot and the meta information.

14 Claims, 9 Drawing Sheets

(51) Int. Cl.
*G06F 16/21* (2019.01)
*G06F 16/36* (2019.01)

(58) Field of Classification Search
CPC .... G06F 16/367; G06F 16/38; G06F 21/6218; B25J 9/161
See application file for complete search history.

(56) References Cited

OTHER PUBLICATIONS

Kobayashi, S., Tamagawa, S., Morita, T., & Yamaguchi, T. (Mar. 2011). Intelligent humanoid robot with japanese wikipedia ontology and robot action ontology. In Proceedings of the 6th international conference on Human-robot interaction (pp. 417-424). ( Year: 2011).*

Kang et al. KR 20060063561 A, System and Method for Generation of Robot Service Plan (Korean Patent Document); combined Korean and English versions. (Year: 2006).*

Park et al. KR 20180048009 A, Service Open-Type Robot Knowledge Framework System (Korean Patent Document ); combined Korean and English versions. (Year: 2018).*

\* cited by examiner

INFORMATION MANAGEMENT APPARATUS AND METHOD FOR OPERATING THE INFORMATION MANAGEMENT APPARATUS

CROSS-REFERENCE TO RELATED APPLICATION

This application claims the benefit of priority to Korean Patent Application No. 10-2021-0036861, filed on Mar. 22, 2021, the entire contents of which are incorporated herein by reference.

TECHNICAL FIELD

The present disclosure relates to an information management apparatus and a method for operating the information management apparatus.

BACKGROUND

Intelligent robots store various types of ontology information to provide various services. Ontology information is data that expresses the relationship between objects in a form that can be understood by a computer, and the intelligent robot may create and store ontology information based on the information of the service provided, the service environment information, and the user information of the service.

Intelligent robot ontology information is complex information about the relationship between objects such as services, users, and robots, and it is important for a repository, which stores the ontology information, to efficiently manage the accumulated intelligent robot ontology information according to purpose and usage. Particularly, depending on the management method and type, there may be a problem that delays the provision of intelligent robot services. Therefore, there is a need for an information management device and method that can efficiently support the reading, copying, and transfer of a repository that stores the ontology information of the intelligent robot.

SUMMARY

The present disclosure has been made to solve the above-mentioned problems occurring in the prior art while advantages achieved by the prior art are maintained intact. An aspect of the present disclosure provides an information management apparatus and a method for operating the information management apparatus that structurally separates repositories for storing ontology information of an intelligent robot to rapidly support service provision of the intelligent robot.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an information management apparatus may include a storage device configured to store ontology information of an intelligent robot that provides a service and includes a plurality of repositories each having meta information, and a storage management device configured to separately store the ontology information of the intelligent robot in the plurality of repositories based on a prefix of the ontology information of the intelligent robot and the meta information.

The ontology information of the intelligent robot may include behavior information of the service provided by the intelligent robot, service environment information observed by the intelligent robot, and user information of the service provided by the intelligent robot. The plurality of repositories may be physically separated from one another. The meta information may include a prefix, a repository access key, and a repository management authority.

The storage management device may be configured to store the ontology information of the intelligent robot in a repository matching a prefix included in corresponding meta information and the prefix of the ontology information of the intelligent robot among the plurality of repositories. Each of the plurality of repositories may include an access manager configured to manage the stored ontology information of the intelligent robot using the repository access key included in the meta information.

The storage management device may be configured to transfer an access request to the access manager of the repository matching the prefix included in the corresponding meta information and the prefix of the ontology information of the intelligent robot among the plurality of repositories when the access request for the ontology information of the intelligent robot is received from an outside. The first access manager that receives the access request may be configured to process the access request when the access key included in the meta information matches the access key included in the access request. The meta information may further include a purpose of the repository, a repository creator, a repository creation time and a repository modification time.

According to an aspect of the present disclosure, a method for operating an information management apparatus may include storing ontology information of an intelligent robot that provides a service in a plurality of repositories, managing meta information of each of the plurality of repositories, and separately storing the ontology information of the intelligent robot in the plurality of repositories based on a prefix of the ontology information of the intelligent robot and the meta information.

The plurality of repositories may be physically separated from one another. The meta information may include a prefix, a repository access key, and a repository management authority. The separately storing of the ontology information of the intelligent robot in the plurality of repositories based on the prefix of the ontology information of the intelligent robot and the meta information may include storing the ontology information of the intelligent robot in a repository matching the prefix included in corresponding meta information and the prefix of the ontology information of the intelligent robot among the plurality of repositories.

The separately storing of the ontology information of the intelligent robot in the plurality of repositories based on the prefix of the ontology information of the intelligent robot and the meta information may include detecting a repository matching the prefix included in the corresponding meta information and the prefix of the ontology information of the intelligent robot among the plurality of repositories when an access request for the ontology information of the intelligent robot is received from an outside, and processing the access request when the access key included in the meta information of the repository matches an access key included in the access request.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
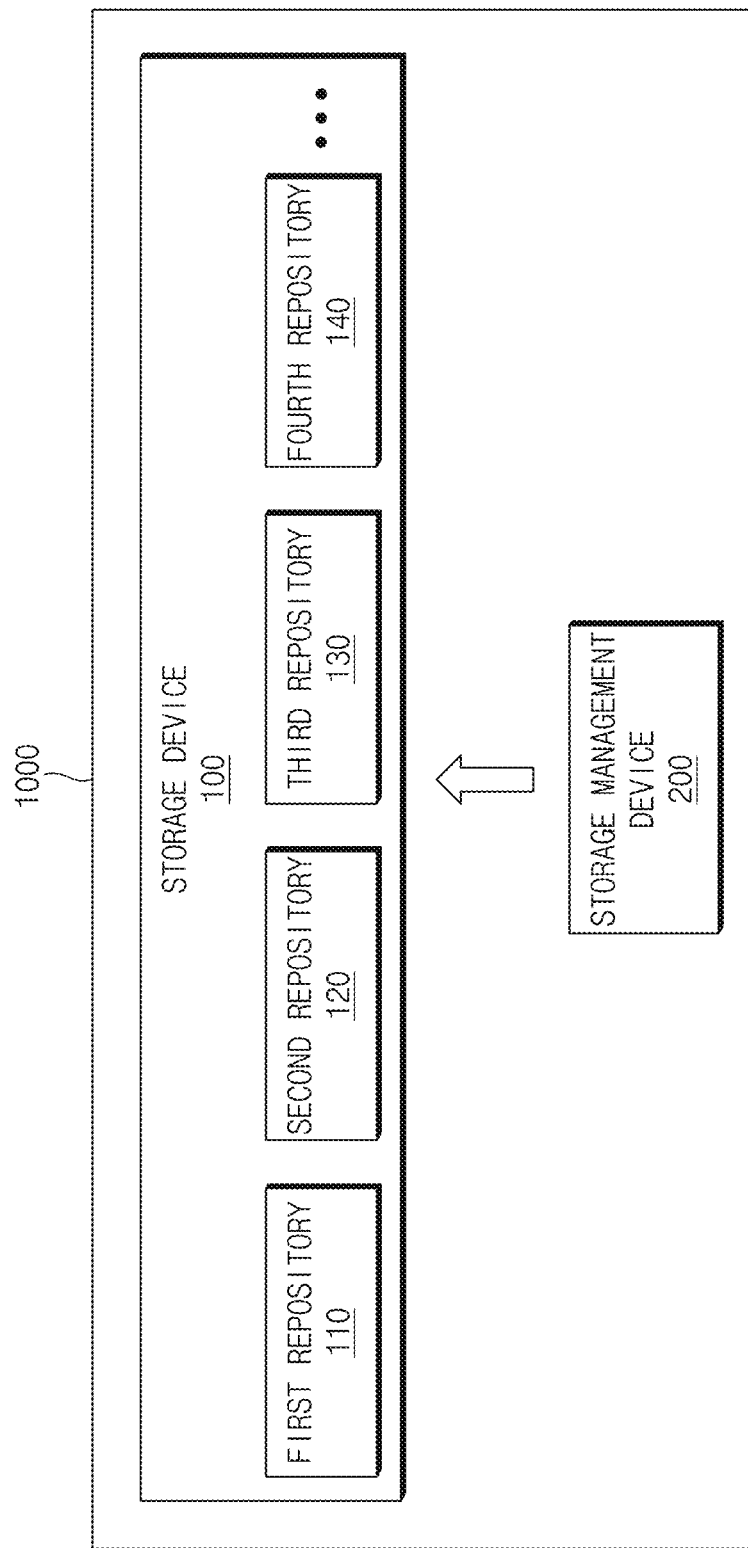
FIG. 1 is a block diagram illustrating an information management apparatus according to an embodiment disclosed herein.

Hereinafter, some embodiments disclosed therein will be described in detail with reference to the exemplary drawings. In adding the reference numerals to the components of each drawing, it should be noted that the identical or equivalent component is designated by the identical numeral even when they are displayed on other drawings. Further, in describing the embodiment disclosed herein, a detailed description of well-known features or functions will be ruled out in order not to unnecessarily obscure the gist of the embodiments disclosed herein.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In describing the components of the embodiments disclosed herein, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the embodiments disclosed herein pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An information management apparatus according to an embodiment disclosed herein may structurally classify repositories for storing ontology information of an intelligent robot based on prefixes included in meta information of the repositories to rapidly support the provision of services of the intelligent robot.

In particular, the intelligent robot may be defined as a robot that recognizes an external environment, determines a situation by itself, and operates autonomously. The intelligent robot may include a non-face-to-face service robot that performs customer service at, for example, a vehicle sales site, or a mobility robot for logistics that picks up and transfers goods. The intelligent robot may obtain and store images, sensor information such as lasers, face recognition information obtained by analyzing the sensor information, and map information on the service area of a robot, and also store status information of a user to be served, high-level situation information such as past service history, or the like.

Additionally, ontology information may be defined as materials expressing a relationship between an object and other objects or the concept of an object, in a form to be understood and processed by a computer. The ontology information of the intelligent robot may be generated based on behavior information of a service provided by the intelligent robot, service environment information observed by the intelligent robot, and user information of the service provided by the intelligent robot. The meta data may be defined as information describing or expressing low-level data, that is, information describing properties of materials, not the materials itself. For example, the meta information may include information creation time, information administrator, information creator, information use conditions, or information use history.

Figure 2:
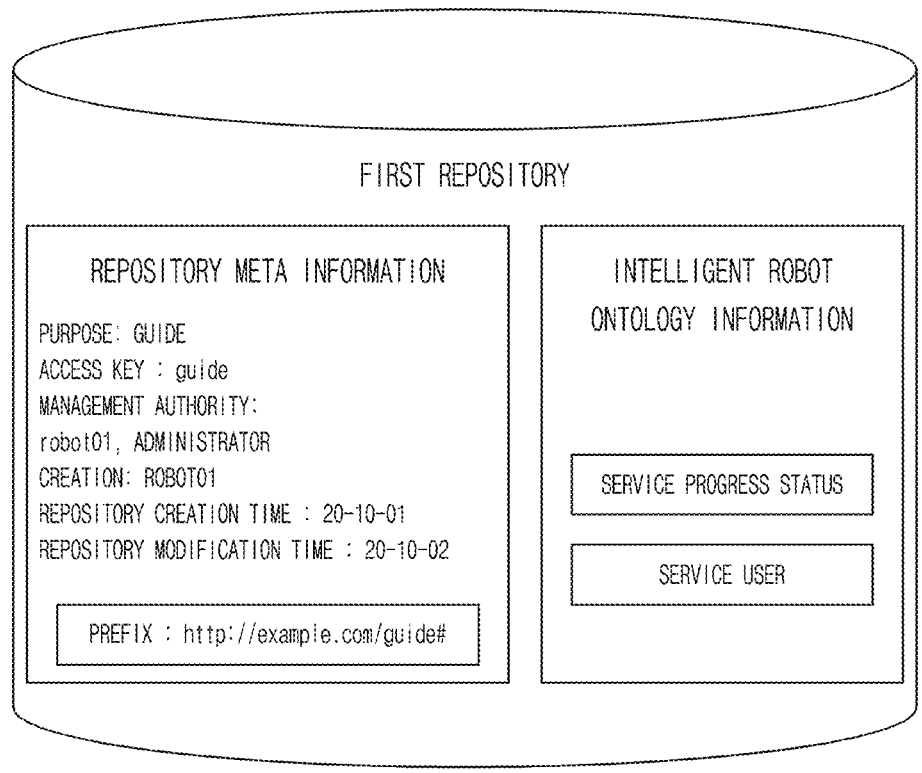
FIG. 2 is a diagram showing a repository for storing ontology information and repository meta information of the intelligent robot according to an embodiment disclosed herein.

Hereinafter, such an information management apparatus and a method of operating the information management apparatus will be described in detail. FIG. 1 is a block diagram illustrating an information management apparatus according to an embodiment disclosed herein. FIG. 2 is a diagram showing a repository for storing ontology information and repository meta information according to an embodiment disclosed herein.

First, referring to FIG. 1, an information management apparatus 1000 according to an embodiment disclosed herein may include a storage device 100 and a storage management device 200. The storage device 100 may be configured to store ontology information of an intelligent robot that provides a service and may include a plurality of repositories each having meta information. For example, the storage device 100 may include a first repository 110, a second repository 120, a third repository 130, and a fourth repository 140. The first repository 110, the second repository 120, the third repository 130, and the fourth repository 140 may be physically or programmatically separated from one another. Although the plurality of repositories is illustrated as being four in FIG. 1, the present disclosure is not limited thereto, and the storage device 100 may include n (n is a natural number greater than or equal to 2) repositories. Hereinafter, the first repository 110 will be described as an example.

The first repository 110 may be configured to store meta information described as the purpose and characteristics of the management of the first repository 110, configurations capable of supporting the management, or the like to improve the convenience in inquiring and managing the first repository 110. For example, referring to FIG. 2, the first repository 110 may be configured to store meta information of each first repository 110 and ontology information of the intelligent robot. In particular, the meta information of the first repository 110 may further include a prefix (http://example.com/guide#), a repository access key (guide), and a repository management authority (robot01, administrator), and further include a purpose of the repository (guide), a repository creator (robot01), a repository creation time (20-10-01), and a repository modification time (20-10-02). In addition, the ontology information of the intelligent robot may include service progress status information and service user information.

Referring back to FIG. 1, the storage management device 200 may be configured to separately store the ontology information of the intelligent robot in the first repository 110, the second repository 120, and the third repository 130, and the fourth repository 140 based on the prefix and meta information of the ontology information of the intelligent robot. In particular, the prefix may be defined as separating categories of the ontology information. In other words, the prefix may be understood as a criterion for separately storing a plurality of pieces of ontology information, not semantic content.

The storage management device 200 may be configured to store the ontology information of the intelligent robot in the first repository 110 which is matched with a prefix included in a corresponding meta information and a prefix of ontology information of the intelligent robot, among the first repository 110, the second repository 120, the third repository 130 and the fourth repository 140. In other words, the storage management device 200 may be configured to match the prefix information included in the meta information and the ontology information of the intelligent robot having the same prefix information, and separately store the information in the first repository 110.

For example, the prefixes of the first repository 110, the second repository 120, the third repository 130, and the fourth repository 140 included in the storage device 100 may include a service, a user, or a robot. For example, the prefix of the first repository 110 may a service, and the ontology information of the intelligent robot stored in the first repository 110 may include a service progress status or a service user. The prefix of the second repository 120 may be a user, and the ontology information of the intelligent robot stored in the second repository 120 may include user information or access authority information.

In addition, for example, the prefix of the third repository 130 may be a robot, and the ontology information of the intelligent robot stored in the third repository 130 may include a state of the robot itself or the robot's capability. The storage management device 200 may be configured to manage the first repository 110 based on the prefix to support execution and management of a plurality of services. In addition, the storage management device 200 may be configured to utilize the first repository 110 as learning training data for unit knowledge information.

Figure 3:
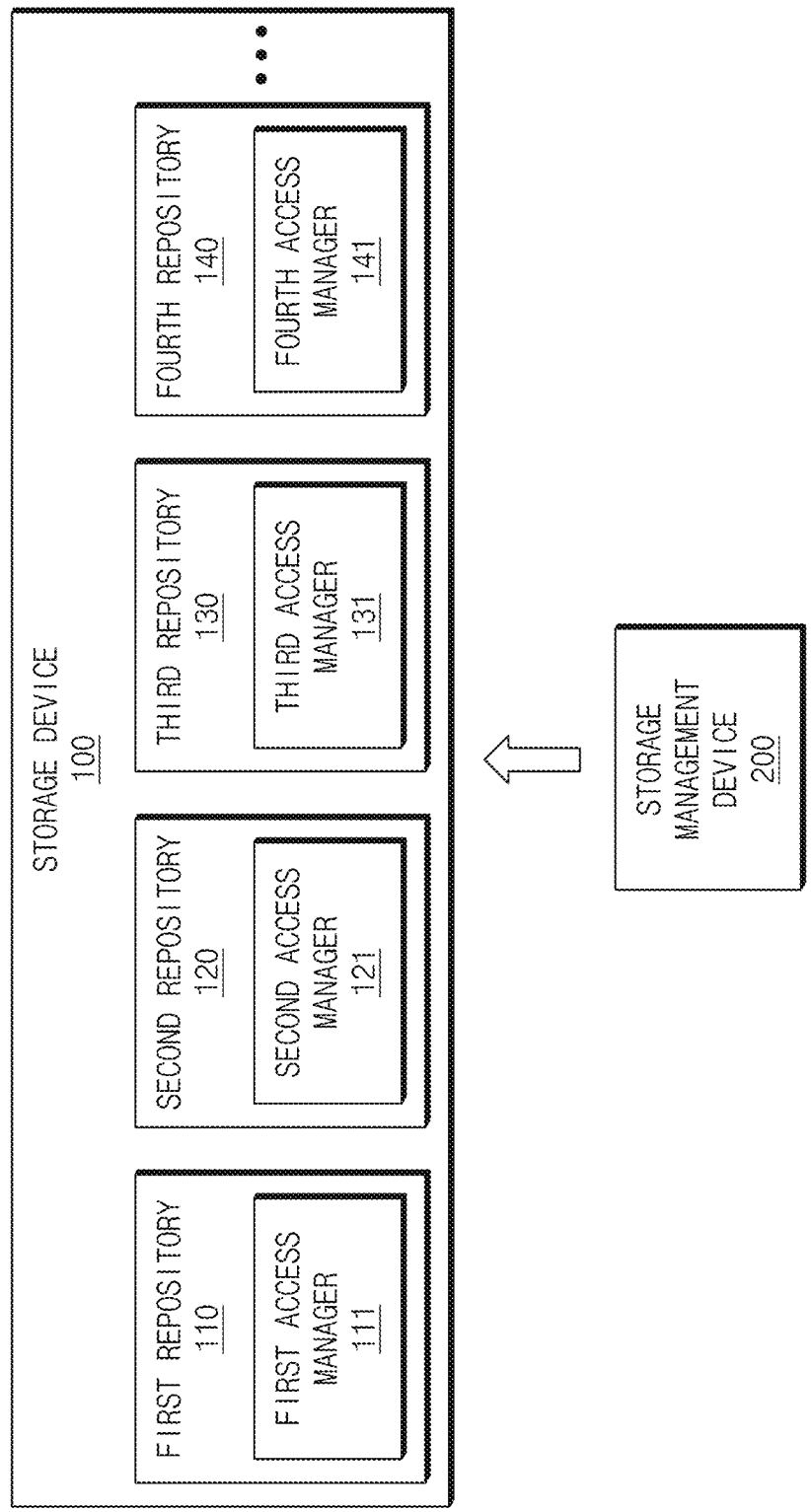
FIG. 3 is a block diagram illustrating an information management apparatus according to another embodiment disclosed herein.

FIG. 3 is a block diagram illustrating an information management apparatus according to another embodiment disclosed herein. Referring to FIG. 3, the information management apparatus 1000 may include the storage device 100 and the storage management device 200.

As described with reference to FIG. 3, the storage device 100 may include the first repository 110, the second repository 120, the third repository 130, and the fourth repository 140. The first repository 110, the second repository 120, the third repository 130, and the fourth repository 140 may include a first access manager 111, a second access manager 121, and a third access manager 131, and a fourth access manager 141, respectively. Hereinafter, the first access manager 111 will be described as an example. The first access manager 111 may be configured to manage the ontology information of the intelligent robot using a repository access key included in the meta information of the first repository 110.

When the storage management device 200 receives an access request for ontology information of the intelligent robot from the outside, the storage management device 200 may be configured to transfer the access request to the first access manager 111 of the first repository 110 in which a prefix included in the corresponding meta information matches a prefix of the ontology information of the intelligent robot, from among a plurality of repositories. When receiving the access request, the first access manager 111 may be configured to process the access request when an access key included in the meta information matches an access key included in the access request. The access request may include, for example, a request to view ontology information of the intelligent robot in the first repository 110, a request to store ontology information of a new intelligent robot in the first repository 110, a request to copy the first repository 110, or a request to transfer the first repository 110.

Figure 4:
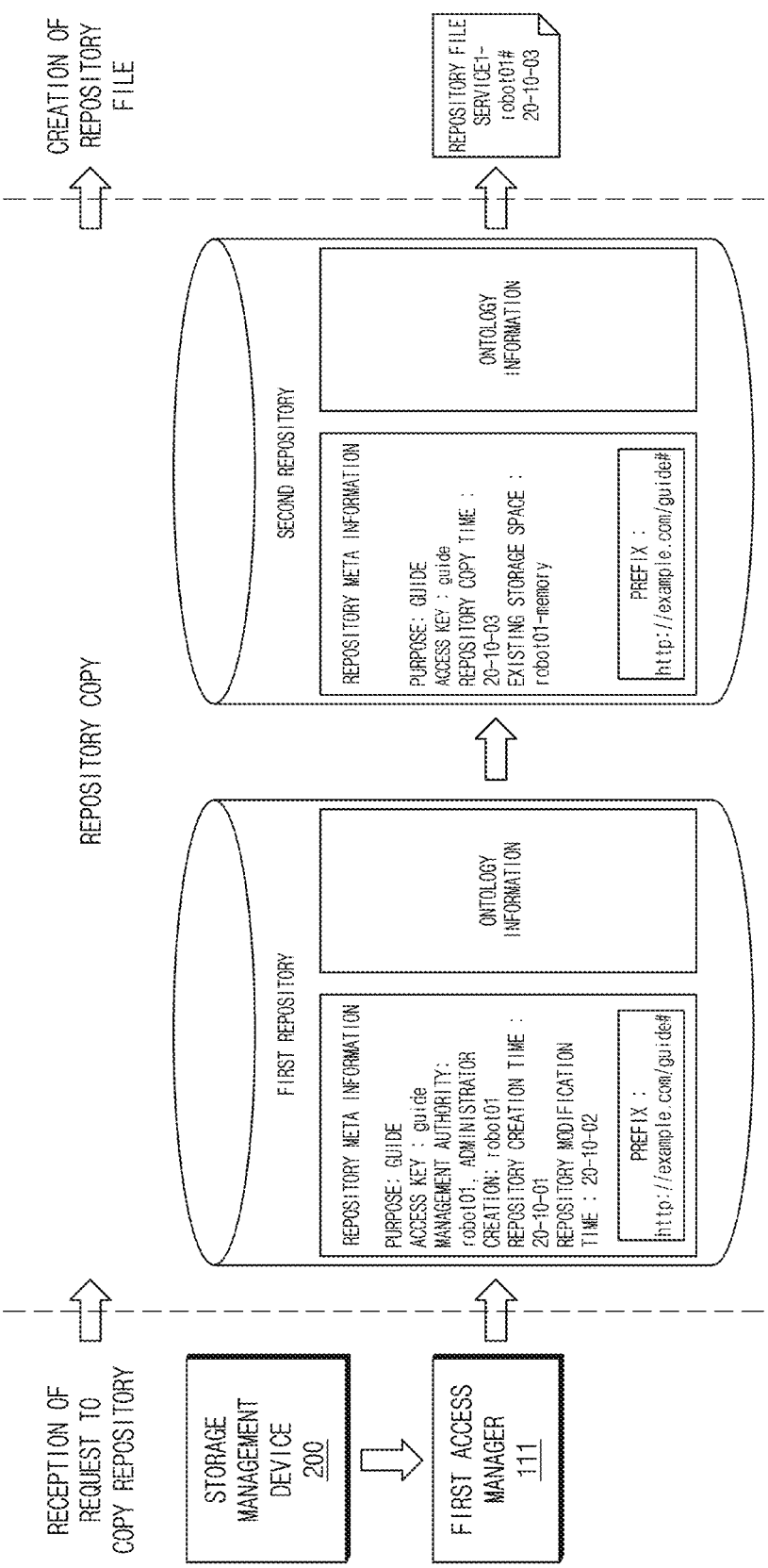
FIG. 4 is a diagram illustrating a response procedure in response to receiving a repository copy request according to an embodiment disclosed herein.
Figure 5:
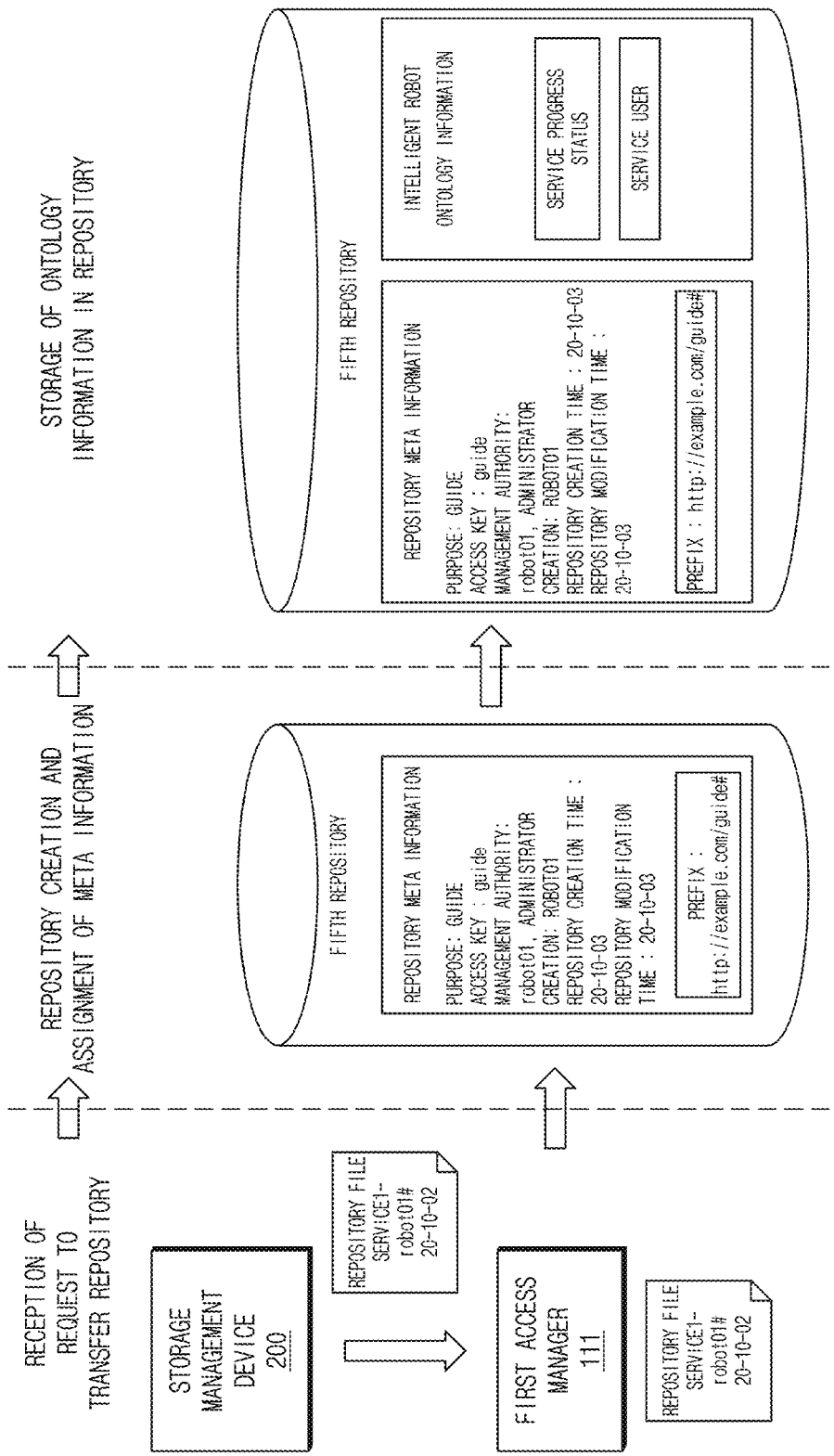
FIG. 5 is a diagram illustrating a response procedure in response to receiving a request to transfer a repository according to an embodiment disclosed herein.

Hereinafter, the operation of the access manager for processing an access request as described above will be described in detail. FIG. 4 is a diagram illustrating a response procedure in response to receiving a request to copy a repository according to an embodiment disclosed herein. FIG. 5 is a diagram illustrating a response procedure in response to receiving a request to transfer a repository according to an embodiment disclosed herein.

First, referring to FIG. 4, when the storage management device 200 transfers a request to copy a repository to the first access manager 111 of the first repository 110, the first access manager 111 that receives the access request may be configured to process the access request when an access key included in the meta information matches an access key included in the access request. Specifically, the first access manager 111 may be configured to copy information recorded in the first repository 110, delete information on management authority, information creator, repository creation time and storage modification time from the meta information of the first repository 110 and generate or create a copied repository file by assigning a repository copy time and meta information of an existing storage space.

Referring to FIG. 5, when the storage management device 200 transfers a repository transfer request to the first access manager 111 of the first repository 110, the first access manager 111 that receives the access request may be configured to process the access request when an access key included in the meta information matches an access key included in the access request. The first access manager 111 may be configured to create a fifth repository, assign meta information to the fifth repository by referring to an existing storage space, a repository copy time, and repository authority information, and write the ontology information of the intelligent robot recorded in the received transfer request in the fifth repository.

As described above, the information management apparatus 1000 according to an embodiment disclosed herein may physically separate a plurality of repositories based on a prefix, collectively manage existing ontology information of the intelligent robot, which is complexly stored, to improve convenience of service management. In addition, the information management apparatus 1000 may structurally separate a plurality of repositories to improve the performance of the intelligent service robot by reducing a search space required for reading or inferring information. In addition, the information management apparatus 1000 may be configured to periodically store ontology information of the intelligent robot, and utilize the accumulated information as effective learning and training data separately based on purposes.

Figure 6:
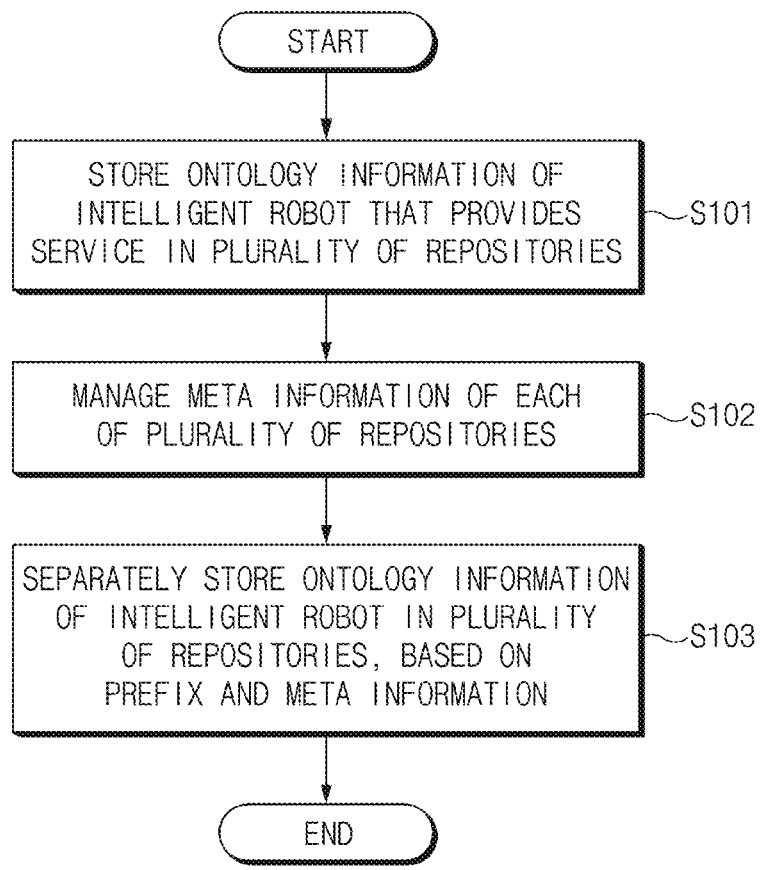
FIG. 6 is a flowchart of a method of operating an information management apparatus according to an embodiment disclosed herein.

FIG. 6 is a flowchart of a method of operating an information management apparatus according to an embodiment disclosed herein. The method described herein may be executed by a controller having a processor and a memory. Referring to FIG. 6, a method of operating an information management apparatus according to an embodiment disclosed herein may include storing ontology information of an intelligent robot providing a service in a plurality of repositories (S101), managing meta information of each of the plurality of repositories (S102), and separately storing the ontology information of the intelligent robot in the plurality of repositories based on the prefix and meta information of ontology information of the intelligent robot (S103).

Hereinafter, S101 to S103 will be described with reference to FIGS. 1 and 3. In S101, the storage device 100 may include the first repository 110, the second repository 120, the third repository 130, and the fourth repository 140, which are a plurality of repositories. The storage device 100 may be configured to store ontology information of an intelligent robot that provides a service and may include a plurality of repositories each having meta information.

In S102, the first repository 110, the second repository 120, the third repository 130, and the fourth repository 140 may be configured to manage their respective meta information and ontology information of the intelligent robot. In S102, the meta information of the first repository 110 may include a prefix, a repository access key, and a repository management authority, and may further include a purpose of the repository, a repository creator, a repository creation time and a repository modification time.

In S103, the storage management device 200 may be configured to separately store the ontology information of the intelligent robot in the first repository 110, the second repository 120, and the third repository 130, and the fourth repository 140, which are the plurality of repositories, based on the prefix and meta information of the ontology information of the intelligent robot. In particular, the prefix may be defined as separating the categories of ontology information. The prefix may be defined as a criterion for separately storing a plurality of ontology information, not a semantic content.

In S103, the storage management device 200 may be configured to store the ontology information of the intelligent robot in the first repository 110, which is matched with the prefix included in the corresponding meta information and the prefix of the ontology information of the intelligent robot, among the plurality of repositories of the first repository 110, the second repository 120, and the third repository 130, and the fourth repository 140. In S103, the first access manager 111 may be configured to manage the ontology information of the intelligent robot using a repository access key included in the meta information of the first repository 110.

Additionally, S103 may include detecting the first repository 110 matched with a prefix included in the corresponding meta information and a prefix of the ontology information of the intelligent robot, among the plurality of repositories, the first repository 110, the second repository 120, the third repository 130, and the fourth repository 140, and processing an access request when the access key included in the meta information of the first repository 110 matches an access key included in the access request, when the first access manager 111 receives an access request for ontology information of the intelligent robot from the outside.

Figure 7:
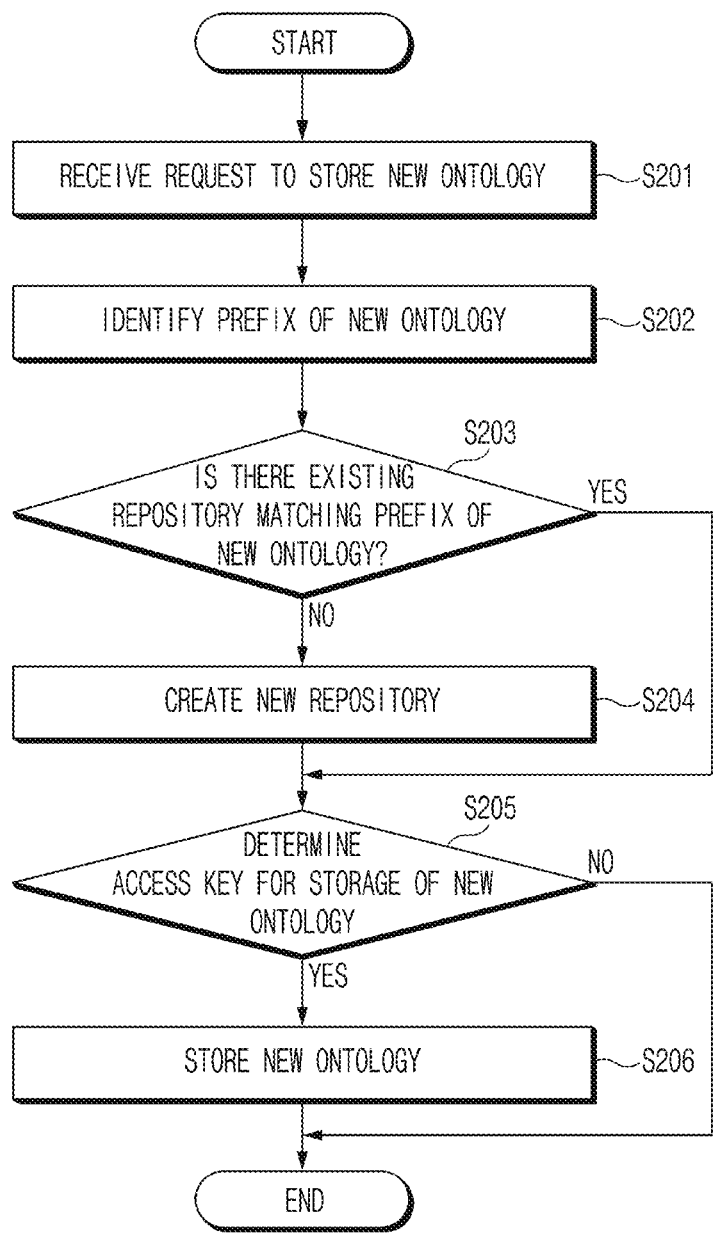
FIG. 7 is a flowchart of a method of operating an information management apparatus when a request to store new ontology information occurs according to an embodiment disclosed herein.
Figure 8:
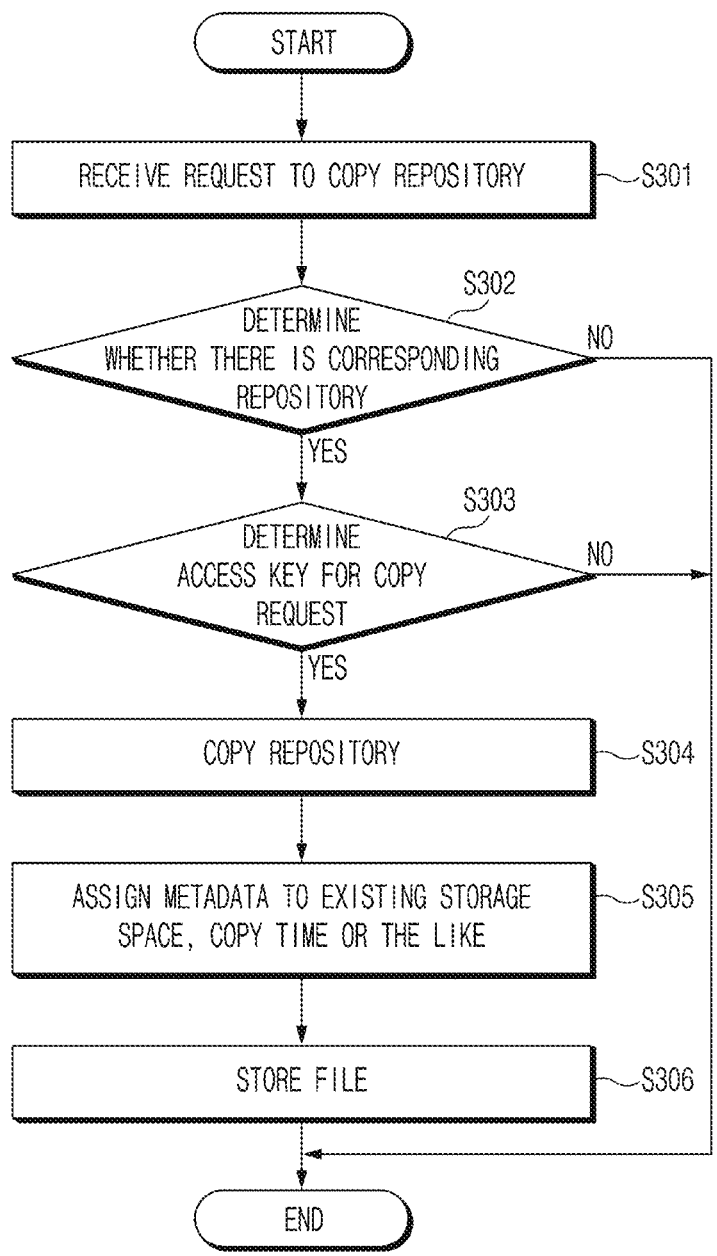
FIG. 8 is a flowchart of a method of operating an information management apparatus when a request to copy a repository occurs according to an embodiment disclosed herein.
Figure 9:
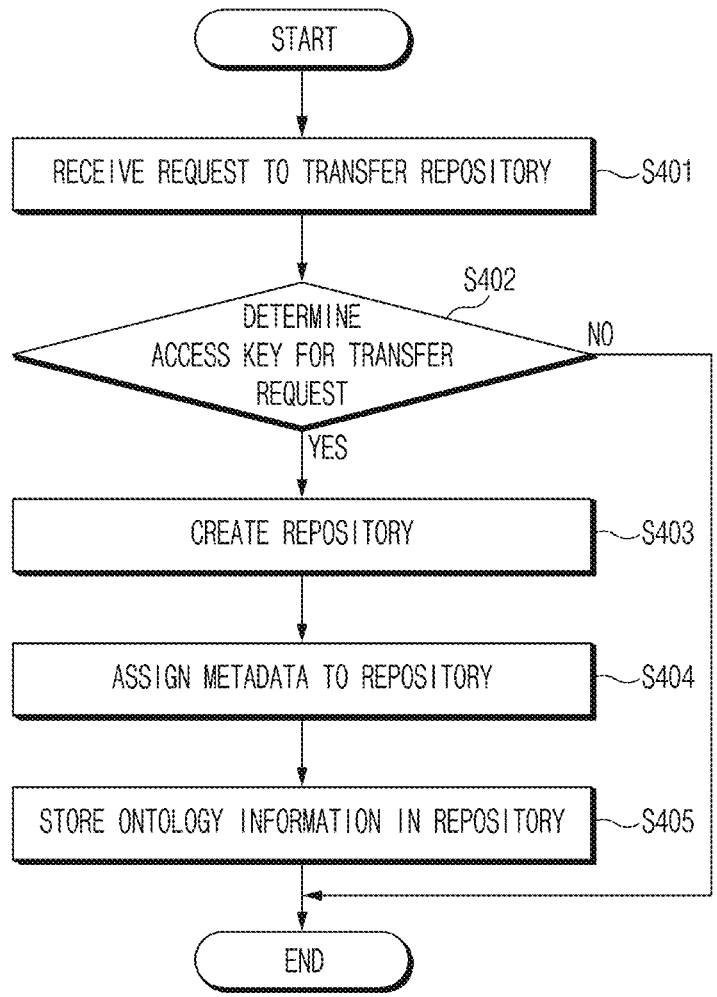
FIG. 9 is a flowchart of a method of operating an information management apparatus when a request to transfer a repository occurs according to an embodiment disclosed herein.

FIG. 7 is a flowchart of a method of operating an information management apparatus when a request to store new ontology information (hereinafter, referred to as 'ontology information') of a new intelligent robot is generated according to an embodiment disclosed herein. FIG. 8 is a flowchart of a method of operating an information management apparatus when a request to copy a repository occurs according to an embodiment disclosed herein. FIG. 9 is a flowchart of a method of operating an information management apparatus when a request to transfer a repository occurs according to an embodiment disclosed herein.

Hereinafter, S201 to S206, S301 to S306, and S401 to S405 will be described with reference to FIGS. 1 and 3. First, referring to FIG. 7, a method for dealing with a request to store new ontology information may include receiving a new ontology information storage request (S201), identifying a prefix of the new ontology information (S202), determining whether there is an existing repository matching the prefix of the new ontology information (S203), creating a new repository because there is no existing repository matching a new ontology prefix (S204), determining an access key included in the new ontology information storage request (S205), and storing the new ontology information (S206).

In S201, the first access manager 111 may be configured to receive a new ontology information storage request from the storage management device 200. In S202, the first access manager 111 may be configured to identify a prefix of the new ontology information included in the new ontology information storage request. In S203, the first access manager 111 may be configured to determine whether a prefix included in the meta information of the first repository 110 matches a prefix of the new ontology information. In S204, the first access manager 111 may be configured to create a new repository when the prefix included in the meta information of the first repository 110 does not match a prefix of the new ontology information. In S205, the first access manager 111 may be configured to determine whether an access key included in the meta information of the first repository 110 matches an access key included in the new ontology information storage request. In S206, the first access manager 111 may be configured to store new ontology information in the first repository 110.

Referring to FIG. 8, a method of operating the information management apparatus when a repository copy request occurs may include receiving a repository copy request (S301), determining whether there is an existing repository matching a prefix included in the copy request (S302), determining an access key included in the copy request (S303), copying a repository (S304), assigning meta information to the copied repository (S305), and storing the copied repository as a file (S306).

In S301, the first access manager 111 may be configured to receive a request to copy the first repository 110 from the storage management device 200. In S302, the first access manager 111 may be configured to determine whether a prefix included in the meta information of the first repository 110 matches a prefix included in the repository copy request. In S303, the first access manager 111 may be configured to determine whether an access key included in the meta information of the first repository 110 matches an access key included in the repository copy request. In S304, the first access manager 111 may be configured to copy the first repository 110. In S305, the first access manager 111 may be configured to assign meta information to the second repository 120 that is the copied repository. In S305, the first access manager 111 may be configured to store the second repository 120 as a file.

Referring to FIG. 9, a method of operating an information management apparatus when a repository transfer request occurs may include receiving a repository transfer request (S401), determining an access key included in the transfer request (S402), creating a repository (S403), assigning meta information to the created repository (S404) and storing ontology information included in the transfer request in the created repository (S405).

In S401, the first access manager 111 may be configured to receive a request to transfer the first repository 110 from the storage management unit 200. In S402, the first access manager 111 may be configured to determine whether an access key included in the meta information of the first repository 110 matches an access key included in the meta information of the first repository 110. In S403, the first access manager 111 may be configured to create a fifth repository. In S404, the first access manager 111 may be configured to assign meta information to the fifth repository. In S405, the first access manager 111 may be configured to store the ontology information included in the repository transfer request in the fifth repository.

The above description is merely illustrative of the technical idea of the present disclosure, and various modifications and variations may be made without departing from the essential characteristics of the present disclosure by those skilled in the art to which the present disclosure pertains. Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to the information management apparatus and the method of operating the information management apparatus according to the embodiments disclosed herein, it is possible to structurally separate repositories for storing the ontology information of the intelligent robot to efficiently manage the view, copy and transfer of the repositories for storing the ontology information of the intelligent robot, allowing intelligent robots to support service provision without delay.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An information management apparatus, comprising:
one or more processors; and
a non-transitory computer-readable storage medium storing computer-executable instructions that when executed by the one or more processors, cause the processor to:
store ontology information of an intelligent robot that provides a service and including a plurality of repositories each having meta information; and
separately store the ontology information of the intelligent robot in the plurality of repositories based on a prefix of the ontology information of the intelligent robot and the meta information.

2. The information management apparatus of claim 1, wherein the ontology information of the intelligent robot includes behavior information of a service provided by the intelligent robot, service environment information observed by the intelligent robot, and user information of the service provided by the intelligent robot.

3. The information management apparatus of claim 1, wherein the plurality of repositories are physically separated from one another.

4. The information management apparatus of claim 1, wherein the meta information includes a prefix, a repository access key, and a repository management authority.

5. The information management apparatus of claim 4, wherein the instructions further cause the one or more processors to store the ontology information of the intelligent robot in a repository matching a prefix included in corresponding meta information and the prefix of the ontology information of the intelligent robot among the plurality of repositories.

6. The information management apparatus of claim 4, wherein each of the plurality of repositories includes an access manager configured to manage the stored ontology information of the intelligent robot using the repository access key included in the meta information.

7. The information management apparatus of claim 6, wherein the instructions further cause the one or more processors to transfer an access request to the access manager of the repository matching the prefix included in the corresponding meta information and the prefix of the ontology information of the intelligent robot among the plurality of repositories in response to the access request for the ontology information of the intelligent robot being received.

8. The information management apparatus of claim 7, wherein the instructions further cause the one or more processors process the access request when the access key included in the meta information is configured to match an access key included in the access request.

9. The information management apparatus of claim 4, wherein the meta information further includes a purpose of the repository, a repository creator, a repository creation time, and a repository modification time.

10. A method for operating an information management apparatus, comprising:
- storing, by a processor, ontology information of an intelligent robot that provides a service in a plurality of repositories;
- managing, by the processor, meta information of each of the plurality of repositories; and
- separately storing, by the processor, the ontology information of the intelligent robot in the plurality of repositories based on a prefix of the ontology information of the intelligent robot and the meta information.

11. The method of claim 10, wherein the plurality of repositories are physically separated from one another.

12. The method of claim 10, wherein the meta information includes a prefix, a repository access key, and a repository management authority.

13. The method of claim 12, wherein the separately storing of the ontology information of the intelligent robot in the plurality of repositories based on the prefix of the ontology information of the intelligent robot and the meta information includes storing the ontology information of the intelligent robot in a repository matching the prefix included in corresponding meta information and the prefix of the ontology information of the intelligent robot among the plurality of repositories.

14. The method of claim 12, wherein the separately storing of the ontology information of the intelligent robot in the plurality of repositories based on the prefix of the ontology information of the intelligent robot and the meta information includes:
- detecting, by the processor, a repository matching the prefix included in the corresponding meta information and the prefix of the ontology information of the intelligent robot among the plurality of repositories in response to receiving an access request for the ontology information of the intelligent robot, and
- processing, by the processor, the access request when the access key included in the meta information of the repository matches an access key included in the access request.

* * * * *